May 15, 1934. F. D. WARREN 1,958,456
FLIGHT LEVEL INDICATOR FOR AIRCRAFT
Filed March 19, 1930
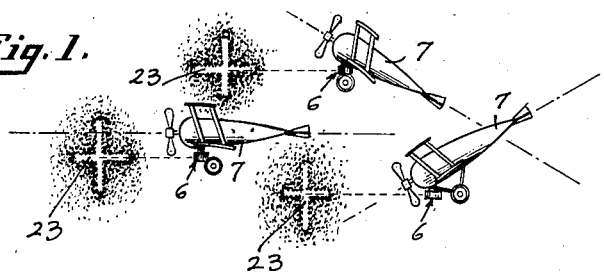
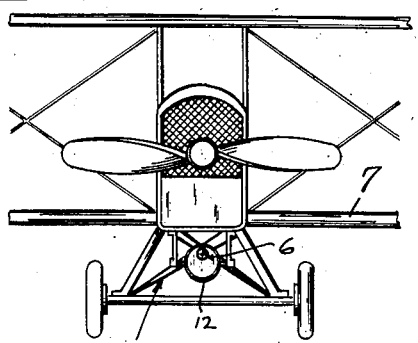
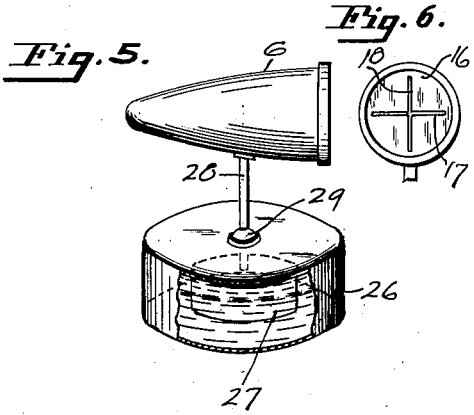
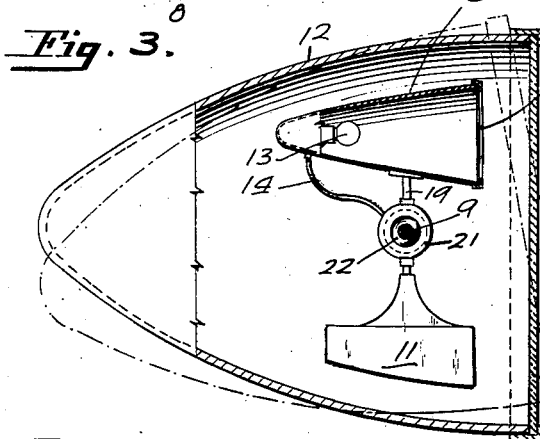
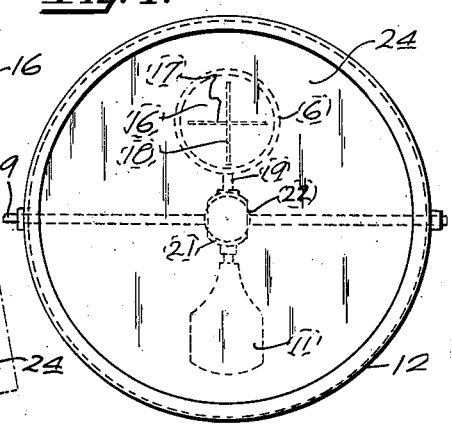
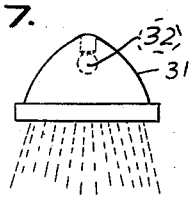
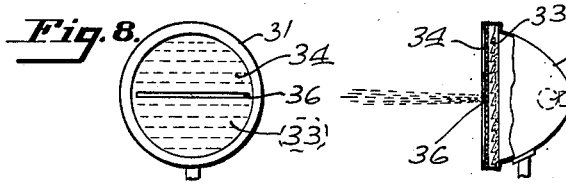
INVENTOR.
FRANK D. WARREN
BY
ATTORNEYS.

Patented May 15, 1934

1,958,456

UNITED STATES PATENT OFFICE 1,958,456

FIGHT LEVEL INDICATOR FOR AIRCRAFT

Frank D. Warren, Oakland, Calif., assignor of twelve and one-half per cent to Norman Apollonio, Camino, Calif.

Application March 19, 1930, Serial No. 437,241

5 Claims. (Cl. 33—46)

This invention relates to flight indicator apparatus.

It is the primary object of the invention to facilitate flying in fog, or in dark, or under circumstances where poor visibility prevents the pilot from seeing the horizon, and to judge the attitude of the aircraft relatively to the ground.

Another object of the invention is the provision of an indicator guide light to form an artificial horizon, preferably on the outside of the aircraft, or in such other position as to be readily observable by the pilot similarly to the natural horizon, without necessitating the use of the inclinometers and like instruments, on the instrument board; means being provided to maintain the guide light projecting in a constant direction at all times regardless of the attitude of the aircraft.

Another object of the invention is to produce an artificial horizon to guide the flight in fog, or at night, or under conditions of poor visibility, which horizon is caused to appear outside of the aircraft, or in other constant natural positions to be observable by the pilot in a natural manner, whereby the equilibrium of the pilot is retained at all times, thus obviating the dangers attendant to flying by the usual inclinometers and the like instruments on an instrument board.

Other objects and advantages are to provide flight indicator apparatus that will be superior in point of simplicity, inexpensiveness of construction, positiveness of operation, and facility and convenience in use and general efficiency.

In this specification and the annexed drawing, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

The invention is clearly illustrated in the accompanying drawing, wherein

Fig. 1 is a diagrammatic view of airplanes in different attitudes, indicating the relative positions of the artificial horizons reflected on fog.

Fig. 2 is a front view of an airplane showing the apparatus mounted at the landing gear of the airplane.

Fig. 3 is a sectional view of the light projecting and directing apparatus.

Fig. 4 is a front view of the apparatus.

Fig. 5 is a perspective view of a modified form of the apparatus.

Fig. 6 is a front view of the light projector.

Fig. 7 is a plan view of a light projector.

Fig. 8 is a front view of the light projector, and

Fig. 9 is a side view partly in section of the light projector.

When an aircraft is in flight, its attitude is determined by the pilot, by watching its relative position to the horizon. When the pilot can observe the horizon, he can readily correct the position of the aircraft relatively thereto. Under conditions of poor visibility, such as flying in fog, or at night, the horizon is not visible, and there is no visible object outside of the aircraft by which the pilot can determine the change of position or attitude of the aircraft, therefore the aircraft usually must be directed by instruments on an instrument board. Flying by instruments is an unnatural condition, and the average pilot loses his equilibrium after a comparatively short flight under that condition. The pilot under these unfavorable conditions, in many instances, loses his equilibrium to such an extent that he does not believe in his instruments. For instance, in the case of an airplane coming out of a tail spin, the pilot has a feeling of going into another tail spin in the opposite direction, and by manipulating his controls, to come out of this second and imaginary tail spin, he actually causes a tail spin. Naturally this would not happen in clear weather where the pilot could judge the condition of the airplane by observing the horizon. The fore and aft,—lateral—or universal-inclinometers, and other instruments on the instrument board are not sufficiently natural guidance to take the place of a visible object fixed relatively to the ground, outside of the instrument board, or outside of the aircraft.

In order to provide a visible guide directionally constant relatively to the ground, I project an artificial horizon, preferably outside of the aircraft, which may be observed by the pilot in a natural manner, similarly to the natural horizon. While it is preferable that such a guide light be horizontal at all times, it is possible to provide a guide light appearing constantly in a direction other than horizontal if so required by special conditions.

In carrying out the invention a light projector 6 is universally mounted on an aircraft such as an airplane 7, preferably supported on the landing gear 8 of the latter, by means of a cross bar. The projector 6 is maintained constantly in a preferably horizontally projecting position, by the action of a counterweight or pendulum 11. The entire apparatus is inclosed in a casing 12, fixed on the bar 9, which latter in turn is fixedly held on the landing gear 8.

The projector 6 is shown as conical but it may be made spherical or any other suitable shape. In the projector 6 is mounted an electric light 13, which is connected thru a flexible conduit 14 to a source of electricity, such as a battery in the airplane. The larger end of the projector 6 is covered by a shield 16. On the shield there is a horizontal slit 17, and a vertical slit 18 across the slit 17. The slits 17 and 18 are very narrow and are centrally located on the shield 16, to allow the projection of very thin beams of light.

From the projector 6 extends downwardly a stem 19 supported on a hollow spherical socket 21, of the usual construction. The socket 21 is held with freedom of universal movement on a ball 22 on the bar 9. To the socket 21 is fixedly secured the counterweight 11, which assumes at all times, a vertical position.

Whenever the airplane changes its inclination relatively to the ground, the counterweight 11 causes the turning of the apparatus into a true vertical position, so that the light is projected from the projector 6 in a true horizontal direction at all times.

The light projected is reflected on the screen formed by the fog, and an artificial horizon appears on the fog at a considerable distance from the airplane. This artificial horizon is maintained in a constant direction, due to the afore-described action of the counterweight 11, so that the pilot can judge the attitude of the airplane by the apparent rising, or lowering, or side movement of this horizon light. The artificial horizon is designated by the numeral 23. The dash and dot lines in Fig. 1 indicate the fore and aft axis of the airplane, and the interrupted dash lines indicate the direction of the light rays projected by my apparatus. This artificial horizon 23 may be observed by the pilot in a natural manner, and shows the attitude of the airplane similarly to the natural horizon, therefore the aforementioned dangers attendant to instrument flying are entirely eliminated.

The casing 12 is shown as covered by a glass 24, however it may be opened if so desired.

In order to hold the counterweight of the apparatus against excessive vibration, a vessel 26 is provided, as shown in Figs. 5 and 6. The vessel 26 is filled with a non-freezing fluid, and is fixedly supported on the airplane. A cylindrical body 27 is immersed in the fluid, and is movable in the vessel 26, and is universally fulcrumed in said top by a ball and socket joint 29. The projector 6 is fixedly mounted on the free end of the stem 28. The vessel tilts with the airplane, but the body 27 holds the stem 28 in a vertical position at all times.

The thin beams of light of the artificial horizon 23 reflect clearly on the fog. In some instances the aircraft is in flight on a dark night, in comparatively clear weather, but under such conditions that the horizon is not visible. In such flying the light beam itself as projected from the apparatus may be the guiding horizon. For this purpose the light beam is preferably spread into a fan shape so that it forms a gradually widening horizontal fan of light beams. This is accomplished by the type of projector shown in Figs. 7, 8 and 9, wherein a reflector 31 is provided to contain the light 32. The reflector is covered by a lens 33, arranged so that the channels, or grooves of the lens 23 are disposed horizontally on the projector. A shield 34 covers the front of the lens 33. The shield 34 has a horizontal, diametrical slit 36 cut thereinto thru which a narrow beam of light is projected. The action of the lens 33 causes the spreading of the light beam horizontally into a fan shape, that is visible to a comparatively long distance ahead of the path of the airplane. The reflector 31 is to be supported on the airplane in any of the manners heretofore set forth, so as to be utilized to produce the artificial horizon for guiding the pilot.

In the event the projector is in the open, fins may be provided thereon to obtain a balancing wind resistance effect against centrifugal force when the airplane is skidding.

It will be recognized that a particularly simple and effective apparatus is provided to project an artificial horizon outside of the airplane, and to maintain it directionally constant in a suitable position to be observed by the pilot as a guide in a manner similar to the appearance of the natural horizon. The device does not require any careful adjustment and constant attention. The projector may be supported in various ways to accomplish the afore-described effect. For instance, instead of the counterweight, pendulum support, a gyroscopic support can be utilized to maintain the constant direction of the light. In all embodiments the artificial horizon projected into space outside of the aircraft, performs the function of the natural horizon, and indicates the attitude of the aircraft during the flight; the pilot can observe in a natural manner, the diving, banking, gliding, slide slipping, skidding and other inclination of the aircraft without resorting to his instrument board.

Having thus described this invention, what I claim and desire to secure by Letters Patent is:

1. A flight level indicator for aircraft, comprising a light projecting apparatus to project an elongated horizontal beam of light to form a guide outside of the aircraft, and means related to said apparatus to maintain the projected beam in a horizontal position, whereby the position of the aircraft in flight is observable with relation to said guide light.

2. A flight level indicator for aircraft, comprising a light projecting apparatus to project a ray of light outside of the aircraft to form an artificial horizon, means related to the apparatus to maintain the projecting ray of light in a constant direction relatively to the ground at all times; and means on the light projector to spread the projected light in the shape of a horizontal fan-shaped beam.

3. A flight level indicator for aircraft, comprising a light projecting apparatus to project a ray of light, means related to the apparatus to maintain the projecting ray of light in a constant direction relatively to the ground at all times; a shield on the apparatus in the path of the light rays, having a horizontal slit thereon thru which the said light ray is projected to reflect the artificial horizon; and a lens on the apparatus at the said shield to spread the light rays into a substantially fan shaped beam.

4. A flight level indicator for aircraft, comprising a light projecting apparatus to project a ray of light, means related to the apparatus to maintain the projecting ray of light in a constant direction relatively to the ground at all times; a shield on the apparatus in the path of the light rays, having a horizontal slit and a vertical slit across the horizontal slit thereon thru which the said light ray is projected to reflect the artificial horizon.

5. A flight level indicator for aircraft, comprising a light projecting apparatus to project a ray of light, and means to mount the apparatus so that the light is projected in a constant direction relatively to the ground, said means comprising a pendulum supported on the aircraft with freedom of universal swinging movement, said light projector being mounted on the pendulum to project the light in a constant direction, at all times, said means comprising a vessel filled with fluid being fixedly mounted on the aircraft, a body immersed in said fluid, a stem on the body extending thru the side of the vessel and being universally fulcrummed in said side of the vessel, said light projecting apparatus being mounted on the outside end of the stem to be directed by the position of the body in the vessel.

FRANK D. WARREN.